United States Patent
Simó et al.

(10) Patent No.: US 10,521,738 B2
(45) Date of Patent: Dec. 31, 2019

(54) AUTOMATED COLLABORATION WORKFLOW GENERATION IN THING-SOURCING ENVIRONMENTS

(71) Applicant: CA, Inc., New York, NY (US)

(72) Inventors: Marc Solé Simó, Barcelona (ES); Victor Muntés Mulero, Barcelona (ES); Steven L. Greenspan, Scotch Plains, NJ (US)

(73) Assignee: CA, Inc., New York, NY (US)

( * ) Notice: Subject to any disclaimer, the term of this patent is extended or adjusted under 35 U.S.C. 154(b) by 340 days.

(21) Appl. No.: 15/362,905

(22) Filed: Nov. 29, 2016

(65) Prior Publication Data

US 2018/0152506 A1    May 31, 2018

(51) Int. Cl.
*G06Q 10/06* (2012.01)
*G06Q 10/10* (2012.01)
*H04L 29/08* (2006.01)

(52) U.S. Cl.
CPC ......... *G06Q 10/06* (2013.01); *G06Q 10/0631* (2013.01); *G06Q 10/101* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2014/0343984 | A1* | 11/2014 | Shahabi | G06Q 10/06311 705/7.13 |
| 2014/0372160 | A1* | 12/2014 | Nath | G06Q 10/06311 705/7.13 |
| 2016/0132815 | A1* | 5/2016 | Itoko | G06Q 10/06398 705/7.42 |
| 2016/0267425 | A1* | 9/2016 | Li | G06Q 10/063118 |
| 2017/0061357 | A1* | 3/2017 | Dubey | G06Q 10/063112 |
| 2017/0140322 | A1* | 5/2017 | Kozloski | G06Q 10/063112 |
| 2017/0264710 | A1 | 9/2017 | Muntes Mulero et al. | |
| 2017/0300701 | A1* | 10/2017 | Ponta | G06F 21/6218 |

OTHER PUBLICATIONS

Blauuboer, Rob. "How Amsterdam crowdsourced environmental monitoring with the IoT", ComputerWeekly.com, Nov. 2014 [ retrieved on Dec. 24, 2018]. Retrieved from the Internet: <URL: https://www.computerweekly.com/feature/How-Amsterdam-crowd-sourced-environmental-monitoring-with-IoT>. (Year: 2014).*

* cited by examiner

*Primary Examiner* — Esther B. Henderson
*Assistant Examiner* — Dae Kim

(57) ABSTRACT

Provided is a computer system that includes a processor and a memory coupled to the processor, the memory including computer readable program code embodied therein that, when executed by the processor, causes the processor to generate a catalog that identifies a plurality of tasks that a plurality of network resources are available to perform, the network resources including Internet-of-things devices and human network resources and to generate, in response to receiving a request to perform a complex project, a solution path that includes an ordered list corresponding to selected ones of the plurality of tasks that are capable of aggregately performing the complex project, wherein the selected ones of the plurality of tasks define the solution path in an edge graph that include the plurality of tasks represented as edges therein.

17 Claims, 8 Drawing Sheets

AUTOMATED COLLABORATION WORKFLOW GENERATION IN THING-SOURCING ENVIRONMENTS

BACKGROUND

Significant increases in the use of sophisticated systems have enabled world-wide collaboration through home PCs and, more recently, through ubiquitous hand-held devices. The purposes are as numerous as they are varied, and may include content sharing, whether through blogs or many well-known peer-to-peer (P2P) applications. For example, collaborative computation, starting from the early SETI@home project (setiathome.berkeley.edu) was one of the early large-scale grid computing instances.

People are gaining awareness of the power of collaborating through the network, including, for example, social and/or political collaborations. For example, recent instances have occurred where people organized themselves using digital platforms. As the crowd may become more aware of its power, a next natural step may be to enhance the tools and modalities for collaborative computing. Powerful devices, like smartphones and tablets, are able to carry out an impressive amount and array of computation. P2P computing has been shown to be feasible and efficient. For example, services such as Skype, have shown that the model may be valid and may challenge serious cloud-based competitors, such as Google Voice.

By virtue of machines being connected, people may also be "connected" to the network combining their computing and thinking capacity. Trends may be indicating that this model may gain the ability to complement and/or substitute cloud computing by connecting people and machines in a single network. Currently, many people are asynchronously analyzing, synthesizing, providing opinion and labeling and transcribing data that can be automatically mined, indexed and even learned. In this regard, there may be little effective difference between crowdsourcing and classical computing in that the "crowd" is working online, taking digital data as input, and yielding digital data as output. The main difference is that human brain-guided computation is able to perform tasks that computers can hardly do, at overwhelming speeds. Tagging a picture or a video based on their content or answering questions in natural language, are just a couple of examples.

The term crowdsourcing may refer to the increasing practice of outsourcing tasks to a network as an open call over a variety of users. Crowdsourcing may have evolved to exploit the work potential of a large crowd of people remotely connected through a network. For instance, recent efforts have studied different typologies and uses of crowdsourcing and have proposed a possible taxonomy. The suggested taxonomy has categorized crowdsourcing depending on different methodologies and processes divided according to several dimensions that are shown to impact on the behavior of workers within the crowd, and the tasks that can be outsourced to the crowd.

The term thing-sourcing may refer to the idea of mixing the concepts of crowd-sourcing and the Internet of Things (IoT) to provide collaborative solutions from humans and machines working together to solve problems. Thing-sourcing may also bring the concept of "open calls", which may be typical from crowd-sourcing to the IoT domain.

Crowd-sourcing can be used to perform a wide range of tasks. Typically, tasks may be split into several sub-tasks, each of which performed by a single person. How these sub-tasks are organized (i.e., collaboration workflow) may have a significant impact on the performance, cost, time, and/or quality of the output. Thus, determining how to create collaborative workflows may be a relevant problem for crowd-sourcing. Typical solutions may rely on humans making decisions on how to organize a collaborative workflow.

Similar challenges may arise for thing-sourcing. However, since many of the actors in thing-sourcing are machines and not humans, different factors may be considered. For example, machines may be significantly less flexible than humans in the types of tasks they can perform and may likely have less self-awareness. As such, it may be advantageous to determine if there is a suitable workflow that may be used to complete a particular task.

BRIEF SUMMARY

Embodiments herein include methods, computer program products and systems that may be configured and/or operable to perform operations described herein. A computer implemented method may include receiving, from each of a plurality of network resources, skill identification data that corresponds to a skill that is possessed by a corresponding network resource of the plurality of network resources, generating, for each skill, a task that corresponds to the skill, wherein ones of the plurality of network resources are capable of performing corresponding ones of a plurality of tasks that are based on corresponding ones of a plurality of skills, representing each of the plurality of tasks as an edge in a task graph, the edge connecting an input node that represents an input for the task and an output node that represents an output corresponding to the task, receiving a client input that corresponds to a complex project that is performed using selected ones of the plurality of tasks, wherein the complex project defines a source node that includes input information corresponding to the complex project and a target node that defines output information corresponding to the complex project and generating a solution path in the task graph that includes the selected ones of the plurality of tasks and that connects the source node in the task graph to the target node in the task graph. Some embodiments provide that at least one of receiving skill identification data, generating the task, representing the tasks, receiving the client input, and generating the solution path is performed by at least one processor.

In some embodiments, the plurality of network resources includes a human resource and a network connected device. Some embodiments provide that the network connected device comprises an internet of things device and/or an application programming interface that is executing on a computing device. Some embodiments provide that the network connected device may include a physical device and/or a software defined "virtual device that may represent and collect data from one or more physical and/or virtual devices.

In some embodiments, the solution path includes a task from a human network resource and a task from a device network resource. Some embodiments include receiving, updated skill identification data that corresponds to the skill that is possessed by a corresponding network resource of the plurality of network resources, generating, for each skill, an updated task that corresponds to the skill, wherein ones of the plurality of network resources are capable of performing corresponding ones of a plurality of tasks that are based on corresponding updated ones of the plurality of skills, and updating the task graph to include the updated ones of the plurality of tasks. Some embodiments provide that only tasks that are updated as available are used in generating the solution path in the task graph.

In some embodiments, generating the solution path in the task graph comprises accessing a collaboration pattern library and identifying a collaboration pattern that is operable to perform one of the plurality of tasks.

Some embodiments provide that representing each of the plurality of tasks in the task graph comprises representing edges corresponding to network resources that are available and not representing edges corresponding to network resources that are not available.

In some embodiments, representing each of the plurality of tasks in the task graph comprises representing edges corresponding to network resources that are available and replacing edges corresponding to network resources that are not available with substitute edges. Some embodiments provide that the substitute edges that correspond to a default task and/or a replacement task that is generated from historical task data.

In some embodiments, generating the solution path in the task graph comprises generating a plurality of solution paths that include different combinations of tasks for performing the complex project.

Some embodiments provide that generating the solution path in the task graph comprises generating a plurality of solution paths that include different combinations of tasks for performing the complex project.

In some embodiments, the solution path includes tasks that are performed in parallel with one another and/or tasks that are performed sequentially.

Some embodiments include publishing the task graph at substantially regular intervals, wherein each publication includes the updated ones of the plurality of tasks that are available to be used in the solution path.

In some embodiments, the client input includes a plurality of project goal factors that identify goals corresponding to generating the solution path that identifies tasks connecting the source node in the task graph to the target node in the task graph via an intervening node that is between at least two of the selected tasks. Some embodiments provide that the plurality of project goal factors correspond to a quality factor, a quantity of tasks factor, cost priority factor and/or a completion time factor.

Some embodiments of the present inventive concept include a computer program product comprising a computer readable storage medium having computer readable program code embodied in the medium. The computer code may include computer readable code to represent each of a plurality of tasks as an edge in a task graph, the edge connecting an input node that represents an input for the task and an output node that represents an output corresponding to the task, to receive a client input that corresponds to a complex project that is performed using selected ones of the plurality of tasks, wherein the complex project defines a source node that includes input information corresponding to the complex project and a target node that defines output information corresponding to the complex project, and to generate a solution path in the task graph that includes the selected ones of the plurality of tasks and that connects the source node in the task graph to the target node in the task graph.

Some embodiments include computer readable code to receive updated skill identification data that corresponds to a skill that is possessed by a corresponding network resource of the plurality of network resources, to generate, for each skill, an updated task that corresponds to the skill, wherein ones of the plurality of network resources are capable of performing corresponding ones of a plurality of tasks that are based on corresponding updated ones of the plurality of skills, and to update the task graph to include the updated ones of the plurality of tasks, only tasks that are updated as available are used to generate the solution path in the task graph.

Some embodiments provide that the client input includes a plurality of project goal factors that identify goals corresponding to generating the solution path that identifies tasks connecting the source node in the task graph to the target node in the task graph via an intervening node that is between at least two of the selected tasks. In some embodiments, the plurality of project goal factors correspond to a quality factor, a quantity of tasks factor, cost priority factor and/or a completion time factor.

Some embodiments of the present inventive concept include a computer system that includes a processor and a memory coupled to the processor, the memory comprising computer readable program code embodied therein that, when executed by the processor, causes the processor to perform operations described herein. For example the system may generate a catalog that identifies a plurality of tasks that a plurality of network resources are available to perform, the network resources including Internet-of-things devices and human network resources and generate, in response to receiving a request to perform a complex project, a solution path that includes an ordered list corresponding to selected ones of the plurality of tasks that are capable of aggregately performing the complex project, wherein the selected ones of the plurality of tasks define the solution path in an edge graph that include the plurality of tasks represented as edges therein.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
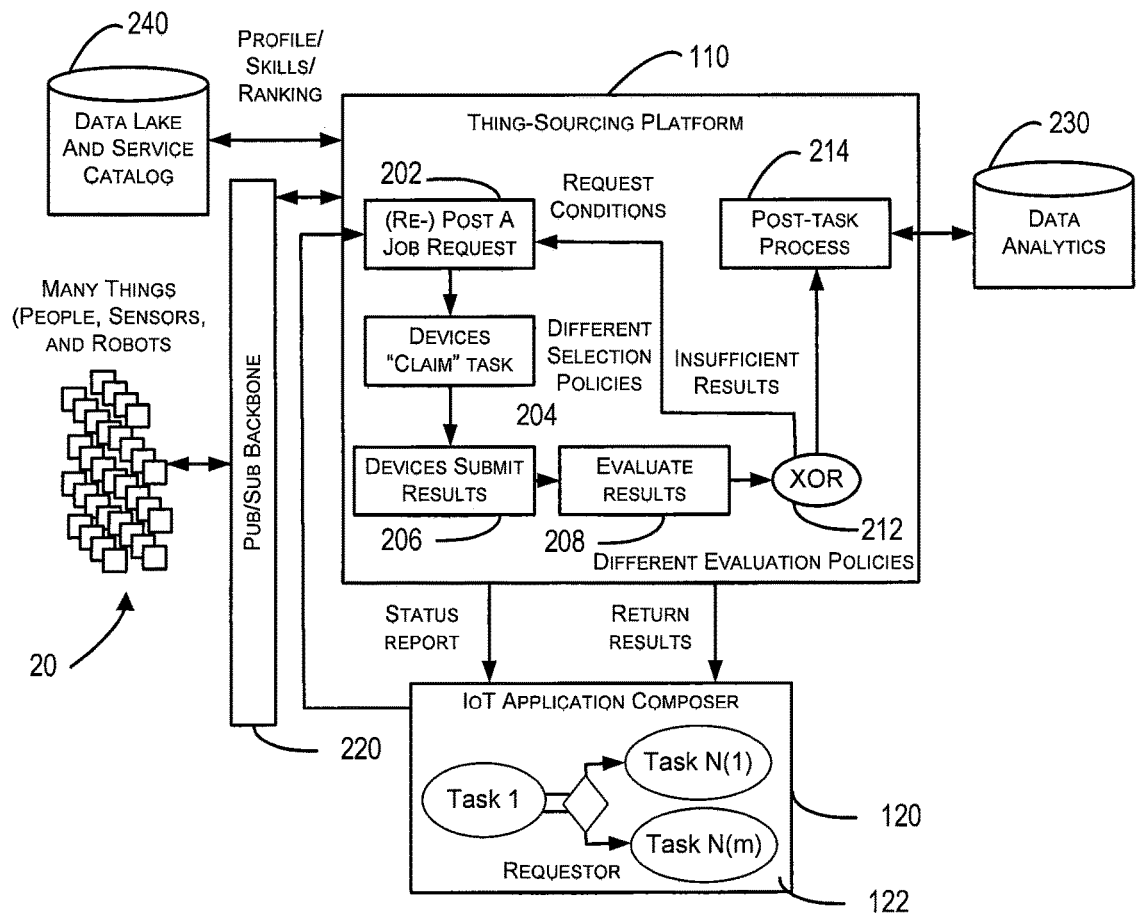
FIG. 1 illustrates a generic architecture for a thing-sourcing platform that can be used to provide thing-sourcing services according to various embodiments described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Crowd-sourcing concepts may be extended to "thing-sourcing," in which tasks can be automatically performed by network connected devices without the need for user interaction. The thing-sourcing participants can include electronic devices that automatically communicate with a thing-sourcing platform via a network. The electronic devices may include conventional computer systems or database management systems but can also include electronic devices in the Internet of Things (IoT), such as mobile phones, sensors, cameras, and other devices. Thing-sourcing participants can also include individuals that communicate with the thing-sourcing platform via a user device that is connected to the network. Thus, in some cases the concepts of crowd-sourcing and thing-sourcing can overlap.

Various embodiments described herein may arise from a recognition that new real-time data that is needed to complete a particular thing-sourcing task or project may not be readily available, either because not enough qualifying devices that could provide new real-time data are available, because the devices that are available do not meet requirements, such as data quality requirements, associated with the thing-sourcing project, and/or because the cost of obtaining new real-time data to complete the thing-sourcing project is prohibitively high.

Various embodiments described herein can overcome these potential difficulties by determining if new-real time data is required/desired to complete the thing sourcing project and, if new real-time data is not required, completing the thing-sourcing project using previously obtained data.

Thing-sourcing projects, or tasks, may be split in several sub-tasks, each one performed by a single device or microservice. A thing-sourcing platform can manage the allocation of tasks, and can also track the reliability, accuracy, timeliness, and capabilities of the contributing devices. New real time data may be required for all sub-tasks of a thing-sourcing project, for none of the sub-tasks of the thing-sourcing project, or for only a portion of the sub-tasks of the thing-sourcing project.

There are a number of practical problems associated with the use of a thing-sourcing platform to obtain data. The reliability of the devices from which data is obtained may affect the value or utility of the data. For that reason, the reliability of the devices from which data is obtained may be ascertained, or at least estimated. There may be a cost associated with using some types of devices to collect data in a thing-sourcing environment. It may therefore be desirable to understand the cost structure associated with using various devices to fulfill a thing-sourcing task.

From a data collection and processing standpoint, it is also desirable to know whether some of the thing-sourcing devices over-sampled or under-sampled, or if the device needs to be recalibrated. It may also be desirable to know the location and/or manufacturer of a particular device, as that information may be used to design a model for interpreting data from the device. In some embodiments, the concept of "thing" may be separated form the device itself. For example, the "thing" that is employed in a task may be software that aggregates and transformed data that is collected from 100's of sensors. Moreover, to make accurate assessments, factors corresponding to the connection to the network may be considered, including associated cost, reliability and/or performance. According to some embodiments, equivalence classes can be defined for devices with the same manufacturer model number, geographic context, and configuration settings. This enables sampling and prediction methods that are not available in crowd-sourcing with humans.

A thing-sourcing platform according to some embodiments may support task allocation by providing, collecting and/or processing data that describes how various devices generate and report information. Such data may include performance characteristics (e.g., response frequency and accuracy, normal range of responses and response latencies based on manufacturer's norms and actual performance data, types of measurements provided), costs (e.g., subscription, micro-transaction fees), geographic factors (e.g., location/mobility), context (e.g., environment conditions), and/or controls (e.g., orientation, movement, and manipulation commands). A thing-sourcing platform according to some embodiments may also be able to calculate appropriate substitutions if a device is unavailable, and be able to generate the correct data subscription workflow. This information can be updated as real performance data is recorded and devices/services are reconfigured.

A thing-sourcing platform according to some embodiments may subscribe to published events from selected thing-sourcing devices, as well as to requests from application composers (requestor devices) and task brokers, which are described in more detail below. The data collected through such subscriptions may be used to construct a map from tasks to sub-tasks to instances of devices (that carry out the tasks) to the performance characteristics of the devices in the context of these tasks.

New application compositions may be matched to a previously recorded mapping, and performance of the new application can be estimated and tested for completeness and efficiency. In addition, optimal solutions (cost vs. quality) can be discovered, and the compositions themselves can be used as search vectors in data mining or process mining analytics. Data variation can be monitored and alarms/alerts can be sent to support IoT operations support. For instance, a task can be split according to some execution workflow of subtasks. Assume for example that a user of the thing-sourcing platform wants to know the temperature at a particular location. This can be split into two sequential subtasks, one to gather several temperature readings from sensors, and another that from these readings performs some computation to decide which is the likely temperature (e.g., computing the average of all the readings, discarding outliers, etc.). Each of these subtasks may have an associated cost/quality value. From these individual estimations a global estimation for the whole task can be computed.

Reference is now made to FIG. 1, which illustrates a generic architecture for a thing-sourcing platform that can be used to provide thing-sourcing services according to various embodiments described herein. Analogously to a crowd-sourcing platform, in a thing-sourcing platform 110 a requester 120 defines a task 122 using a particular formal language and/or natural language. The task 122 is published as an open call by Block 202 and it is made available to thing-sourcing participant devices 20 in a connected ecosystem using a publication/subscription ("pub/sub") backbone 220. (A pub/sub system is a communications model in which one or more information consuming entities subscribe to data feeds published by one or more information generating entities.)

This connected ecosystem may also be called the Internet of Things. Thing-sourcing may also be called hybrid crowd-sourcing in other contexts.

The concept of a "worker requirement" in a crowdsourcing system used to accomplish a task may be defined as a set of constraints on the group of individuals allowed to choose to undertake the task. Constraints may be defined over any property of the profile of individuals (such as ratio of approved contributions, knowledge about a topic, age, gender and/or location), belonging to a group of individuals, or any combination (using conjunctions, disjunctions or negations). The same definition is used herein but is extended to electronic devices in a hybrid system where both human beings (via user devices) and electronic devices may collaborate together to solve a particular task. These user devices and electronic devices may also be collectively referred to as "agents". A property of the profile of an agent may be information about their skills, location, data quality, scores about the quality provided in previous task-solving processes, etc. One or more worker requirements may be imposed directly by a requestor device 120, in connection with a thing-sourced project request, and/or may be imposed by the thing-sourcing platform 110 based on an analysis of the task and/or data needed to complete the task.

A complex problem may be divided by the requestor device 120 into a composition of tasks 122, or a workflow. These tasks 122 are published on the pub/sub backbone 220 by Block 202 through open calls.

Still referring to FIG. 1, the thing-sourcing platform 110 also includes a Block 204 wherein devices may claim a task and a Block 206 where they may submit results. The results may provide a status report to the requestor 120. At Block 208, the results are evaluated and the results may be returned to the requestor 120. Block 212 determines whether the results are sufficient. If not, a job request may be reposted to Block 202. If the results are sufficient, post-task processes may be implemented at Block 214, for example using data analytics 230. The thing-sourcing platform 110 may also rely on a database and service catalog 240 to obtain attributes, profiles, skills and rankings for the agents that can be used to ensure that a worker requirement, if any, is met.

In this architecture, the requestor device 120, which can be a human and/or a machine, may require a particular project to be solved that is sufficiently complex that multiple tasks are necessary to complete the project. As disclosed herein, a collaboration pattern that uses human and/or device network resources that are each configured to solve simple tasks may be automatically generated using the initial task description as well as a set of additional constraints. Examples of such constraints include time, quality and/or confidence factors, among others.

Figure 2:
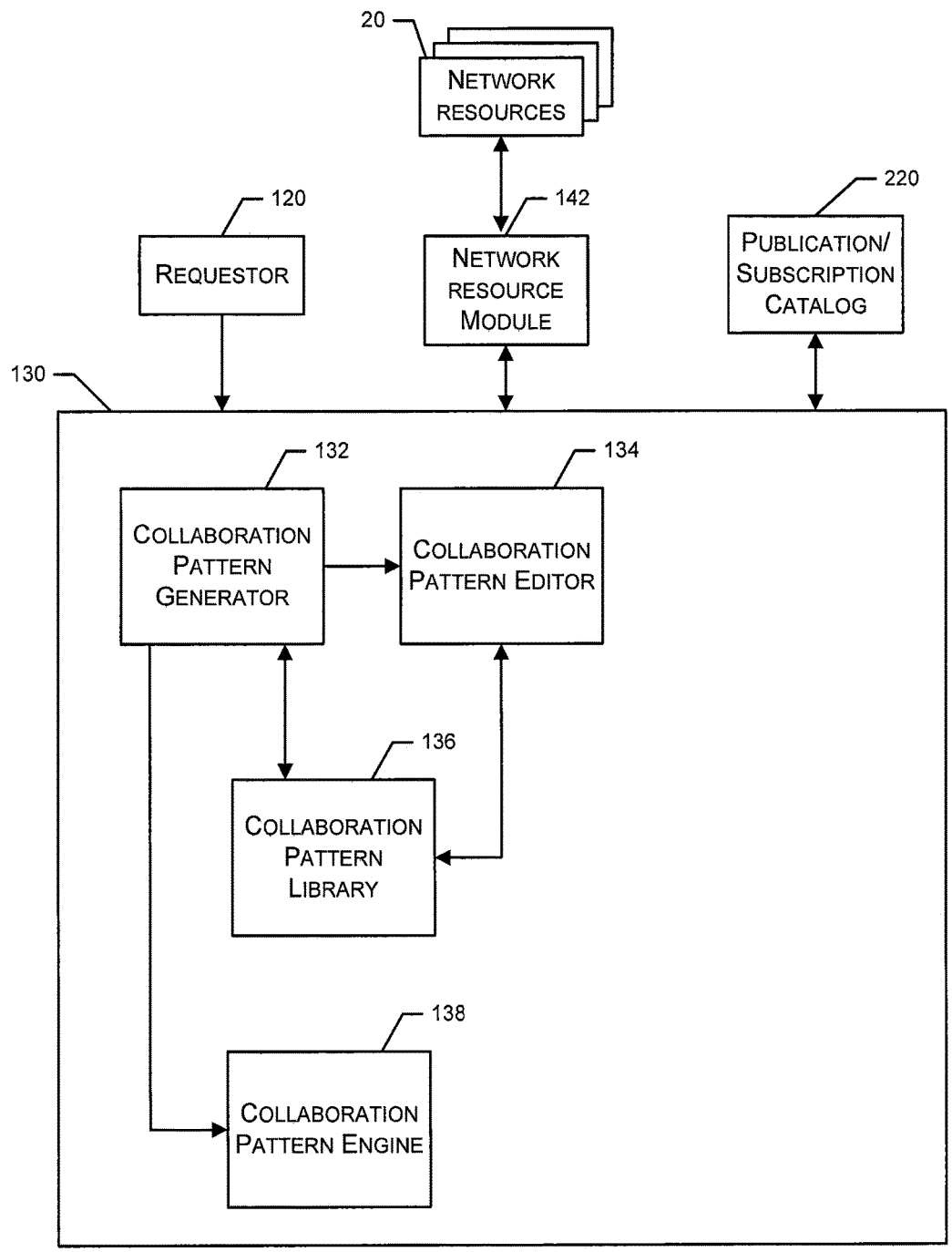
FIG. 2 is a block diagram illustrating devices/modules that may be used according to some embodiments of the present inventive subject matter.

Reference is now made to FIG. 2, which is a block diagram illustrating devices/modules that may be used according to some embodiments of the present inventive subject matter. A thing-sourcing collaboration module 130 may be configured to receive skill identifications corresponding to skills that multiple network resources 20 can provide via the thing-sourcing collaboration module 130. Examples of network resources 20 include humans, sensors, applications running in devices (e.g., API's) and/or robots, among others. Some embodiments provide that the collaboration module 130 receives thing-sourcing project related inputs from a requester 120 and provides collaboration pattern definition, generation, modification, execution and/or management. For example, a thing-sourcing collaboration pattern module 130 may include a collaboration pattern generator 132 that is configured to generate a collaboration pattern responsive to inputs provided by the requestor 120. As used herein, the term "collaboration pattern" may be used to refer to patterns of collaboration of different human and thing-source actors to accomplish one or more complex tasks in a thing-sourcing project. Some embodiments provide that the collaboration patterns are general graphs and thus may not be limited to a specific type of graphs, in contrast with, for example, Turkomatic, which appears to be limited to acyclic graphs. Some embodiments provide that the tasks in collaboration patterns disclosed herein are each assigned user interfaces (UIs) to provide more flexibility and detail regarding the types of tasks that can be performed by the network resources 20.

The collaboration pattern generator 132 may receive inputs from the requestor 120 and generate one or more suggested collaboration patterns that may be stored in a collaboration pattern library 136. In addition to storing collaboration pattern, the collaboration pattern library 136 may store performance data corresponding to different ones of the collaboration patterns including, for example, feedback indicating how well a collaboration pattern has worked in performing different types of thing-sourcing projects. For example, a collaboration pattern that is particularly effective for thing-sourcing localization tasks, such as translating a text from one language to another language, may be less suitable for thing-sourcing works of authorship, such as, for example, travel books.

In some embodiments, the collaboration pattern module 130 may include a collaboration pattern editor 134 that may receive editing inputs that edit the collaboration pattern that corresponds to the thing-sourcing project. The collaboration pattern editor 134 may retrieve collaboration pattern information from and send collaboration information to the collaboration pattern library 136. Tasks that are defined in different elements of collaboration patterns may be performed by network resources 20. The collaboration pattern module 130 may receive and provide network resource data into a publication/subscription catalog 220. Some embodiments provide that network resource profiles may include network resource performance information and one or more network resource specific characteristics. Examples of network resource specific characteristics may include, cost of usage, quality, data accuracy/reliability, time for task completion, geographic knowledge, language skills/fluency levels, and/or schedule limitations, among others. Network resource performance information may include rankings and/or scores for timeliness, accuracy, and/or quality, among others. The network resource profiles may be updated responsive to new network resource performance information and/or network resource specific characteristics.

Some embodiments provide that the collaboration pattern module 130 may include a collaboration pattern engine 138 that is configured to execute and/or manage the execution of a collaboration pattern. Although illustrated herein as the collaboration pattern module 130 including the collaboration pattern generator 132, the collaboration pattern editor 134, the collaboration pattern library 136 and the collaboration pattern engine 138, embodiments are not so limited. For example, any one or more of the described components of the collaboration pattern module may be implemented as separate modules. Additionally, although illustrated as separate from the collaboration pattern module 130, a network resource module 142 that is configured to interface with network resources 20 may be incorporated and/or integrated into and/or with the collaboration pattern module 130.

In some embodiments, the collaboration pattern module 130 including the collaboration pattern generator 132, the collaboration pattern editor 134, the collaboration pattern library 136, the collaboration pattern engine 138 and the network resource module 142 may include one or more graphical interfaces. In this manner, systems and methods disclosed herein may provide a functional and complete thing-sourcing platform from easy-to-create descriptions.

Figure 3:
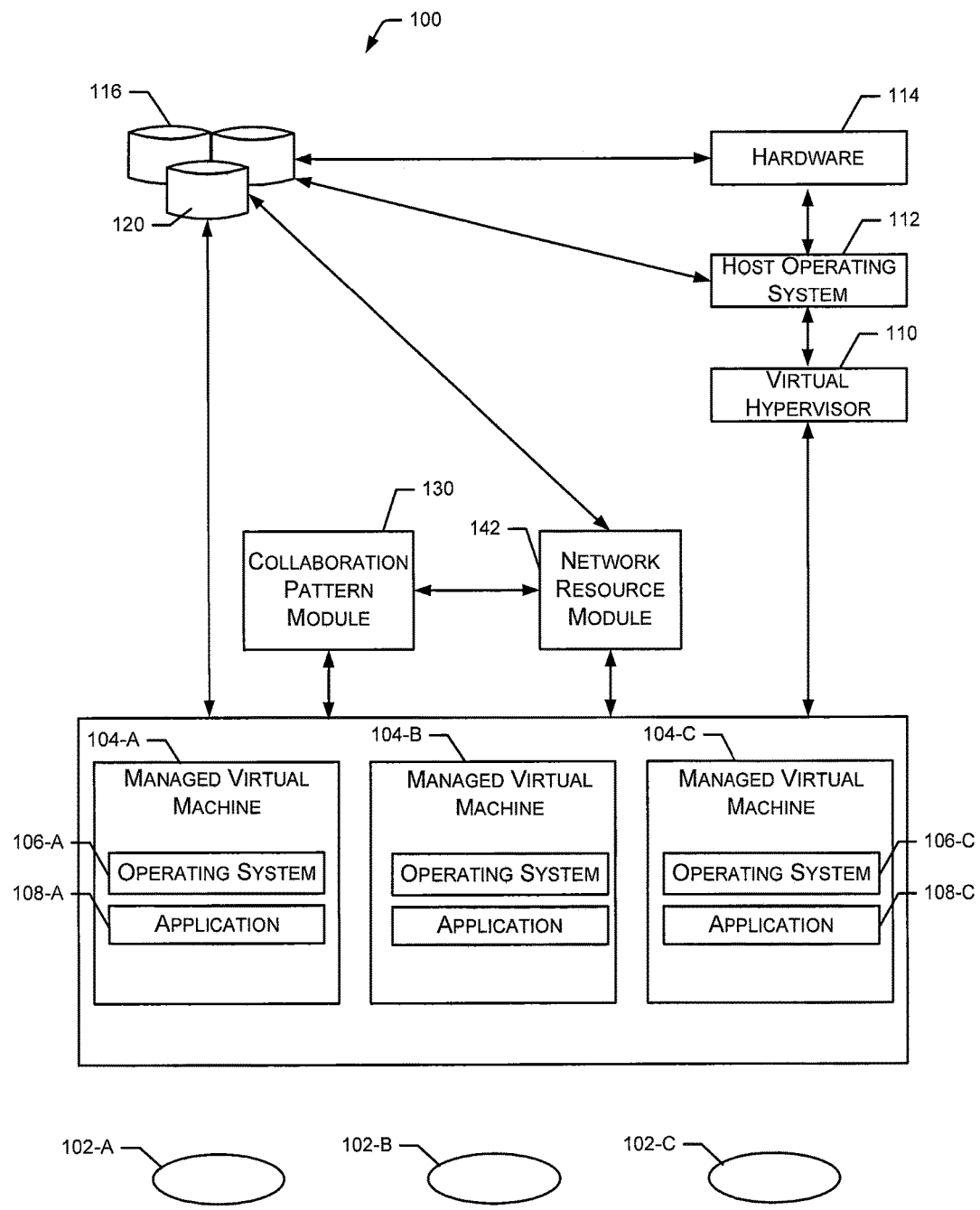
FIG. 3 is a block diagram of a computing system that supports a virtual operating environment according to some embodiments of the present inventive subject matter.

Reference is now made to FIG. 3, which is a block diagram of a computing system that supports a virtual operating environment according to some embodiments of the present inventive subject matter. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit (s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial and/or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications, that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

In some embodiments, a collaboration pattern module 130 may be configured to receive thing-sourcing project related inputs from a requestor and provide collaboration pattern definition, generation, modification, execution and/or management. A network resource module 142 may generate network resource profiles corresponding to human and/or machine assets. Some embodiments provide that network resource profiles may include network resource performance information and one or more network resource specific characteristics.

Although illustrated as a stand-alone functional block, the collaboration pattern module 130 and/or the network resource module 142 may be a module, function, feature and/or service included in and/or integrated with a service that provides thing-sourcing platforms and/or support.

Figure 4:
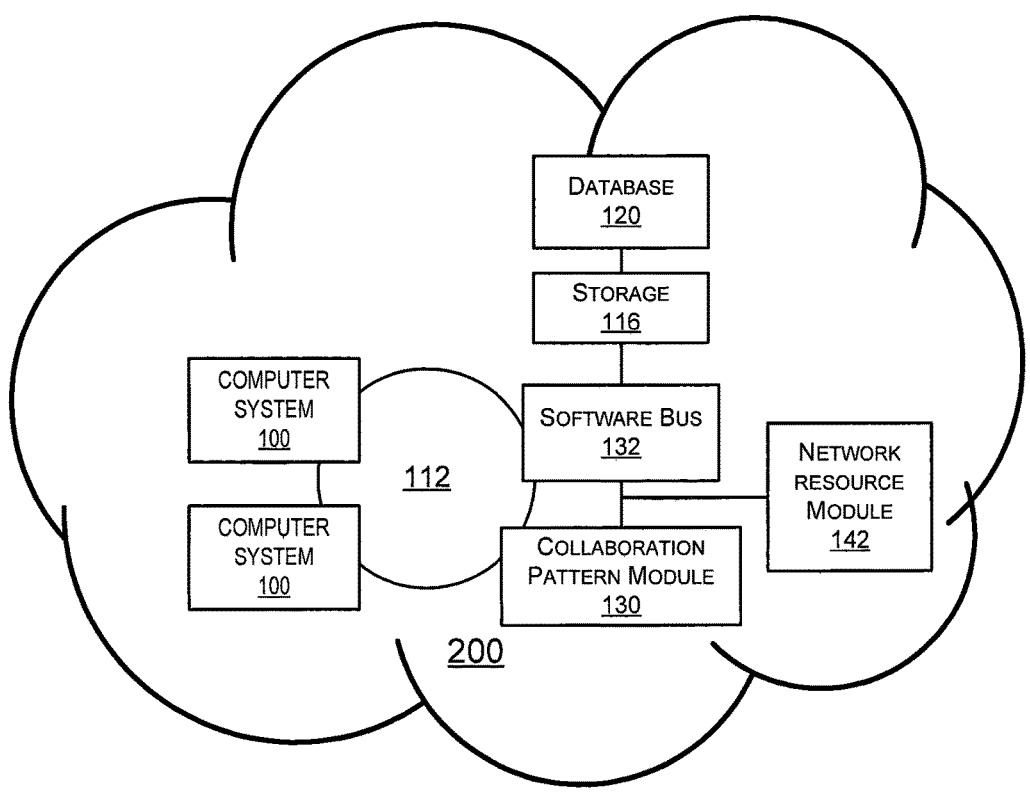
FIG. 4 is a block diagram that illustrates a virtual computing environment according to some embodiments of the present inventive subject matter.

Reference is now made to FIG. 4, which illustrates a virtual computing environment according to some embodiments of the present inventive subject matter. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 4 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

A collaboration pattern module 130 as discussed above regarding FIG. 3 may receive thing-sourcing project related inputs from a requestor and provide collaboration pattern definition, generation, modification, execution and/or management operations. A network resource module 142 as discussed above regarding FIG. 3 may generate network resource profiles corresponding to network resources. The collaboration pattern module 130 and/or the network resource module 142 may be included in and/or provided by one or more of the virtual machines 104 in the cloud 200.

Figure 5:
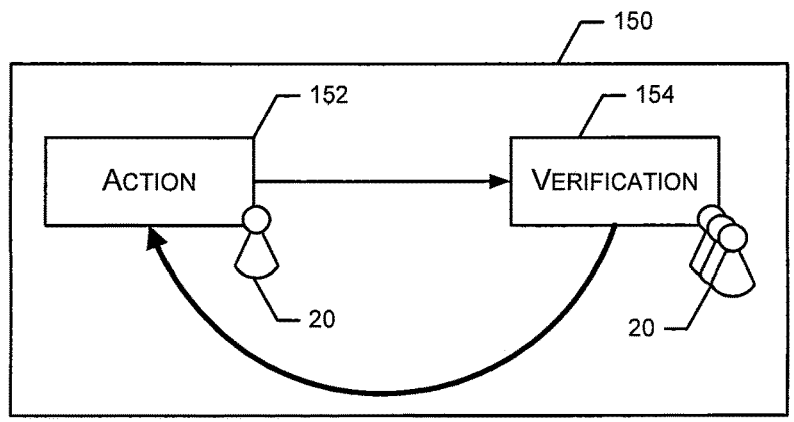
FIG. 5 is a block diagram illustrating an example of an action verification unit that may be used to define collaboration patterns for thing-sourcing according some embodiments of the present inventive subject matter.

Reference is now made to FIG. 5, which is a block diagram illustrating an example of an action verification unit that may be used to define collaboration patterns for thing-sourcing according some embodiments of the present inventive subject matter. An action verification unit 150 may provide an element that may be used as a building block for a collaboration pattern. Although used to explain concepts herein, the action verification unit 150 is just one example of the different collaboration pattern elements and/or types of collaboration pattern elements that may be used as building blocks for collaboration patterns. The action verification unit 150 includes an action 152 that may identify and/or define a task for a network resource 20 to perform. In some embodiments, the action 152 may be referred to as a network resource task. The action verification unit 150 may include a verification 154 that may identify and/or define how completely and/or well the action 152 has been performed. The verification 154 may be performed by one or more other network resources 20. If the results of the verification 154 indicate that the action 152 is not performed completely or satisfactorily, the action 152 may need to be re-performed and/or improved. If the results of the verification 154 indicate that the action 152 has been performed satisfactorily and completely then the action 152 may be accepted, in which case the task corresponding to the action verification unit 150 may be considered complete. In this manner, an iterative process may be provided through which the task may be performed and verified using thing-sourcing.

Figure 6:
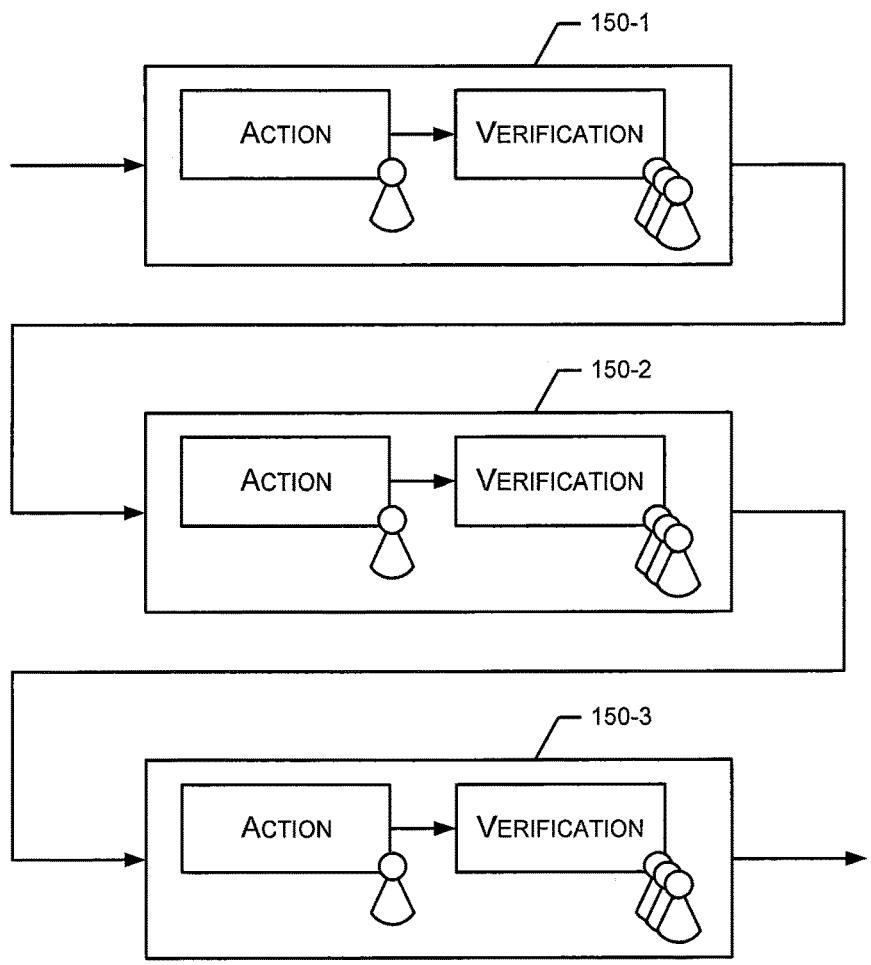
FIG. 6 is a block diagram illustrating multiple action verification units that may be used in collaboration patterns for complex thing-sourcing tasks according to some embodiments of the present inventive subject matter.

Brief reference is now made to FIG. 6, which is a block diagram illustrating multiple action verification units that may be used in collaboration patterns for complex thing-sourcing tasks according to some embodiments of the present inventive subject matter. As discussed above regarding FIG. 5, the action verification unit 150 may provide an element that may be used as a building block for collaboration pattern. In the case of a complex process and/or task, multiple action verification units 150 may be used to define the complex process and/or task into multiple subtasks that may each be performed and verified. For example, in the case of a series of subtasks to be performed serially, a first subtask corresponding to a first action verification unit 150-1 may be performed and verified before performing a second subtask corresponding to a second action verification unit 150-2 that may be performed and verified before forming a third subtask corresponding to a third action verification unit 150-3. Although the subtasks and action verification units 150 are illustrated as being performed in the serial manner, the complex tasks may include one or more combinations of serial and/or parallel subtasks and corresponding action verification units 150.

Figure 7:
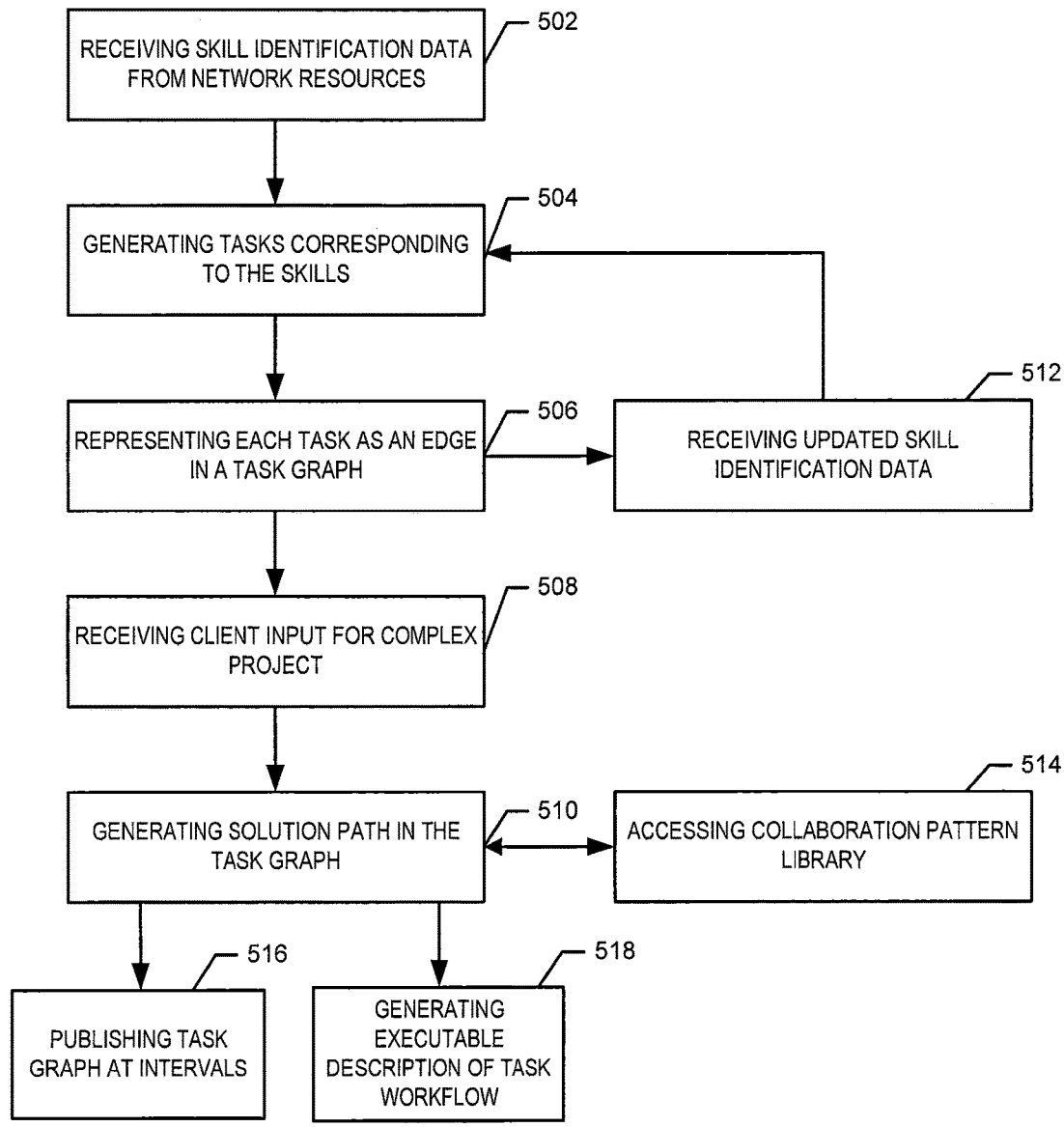
FIG. 7 is a flowchart illustrating operations for systems/methods according to some embodiments of the present inventive subject matter.

Reference is now made to FIG. 7, which is a flowchart illustrating operations for systems/methods according to some embodiments of the present inventive subject matter. Some embodiments include receiving skill identification data from multiple network resources (block 502). The skill identification data may correspond to one or more skills that are possessed by individual ones of the network resources. Some embodiments provide that network resources include human resources and network connected devices. Examples of network connected devices include Internet of things devices and/or application programming interfaces that are executing on different computing devices, among others. For example, when a network resource connects with a thing-sourcing platform as described herein, it may report which skills it has and/or which task it may perform.

For each skill received from a network resource, a task that corresponds to the skill may be generated (block 504). In some embodiments, the tasks may define inputs, outputs and a description of the functionality. Some embodiments provide that, in the context of a network resource that includes an Internet of things sensor, the input may include an address that the sensor sends the data to, the output may be the sensed condition data and/or the function may be the data description.

Each of the tasks may be represented as an edge in a task graph (block 506). For example, each edge in the task graph may connect an input node that represents an input for that task and an output node that represents an output corresponding to that task. In the case of multiple tasks that are to be performed serially, the node that is the output of a first task may be the input node of a second task that is to be performed after the first task is completed.

Some embodiments provide that the edges that are represented in the task graph correspond to network resources that are available and that network resources that are unavailable are not represented as edges in the task graph. In some embodiments, the edges corresponding to otherwise unavailable tasks may be replaced with substitute edges. For example, a given task may have a default output corresponding to a given input even if the network resource is unavailable. Some embodiments provide that a substitute edge may be based on historical performance of the otherwise unavailable network resource.

A client input that corresponds to a complex project may be received (block 508). Some embodiments provide that the complex project is to be performed using selected ones of tasks. In some embodiments, the complex project defines a source node that includes input information corresponding to the complex project and a target node that defines output information corresponding to the complex project. Some embodiments provide that the client input includes multiple project goal factors that identify goals corresponding to the complex project and/or for determining possible solutions to the complex project request.

Examples of project goal factors may include a quality factor, a quantity of tasks factor, cost priority factor and/or a completion time factor. A quality factor may be a factor that identifies a threshold and/or desired quality level corresponding to the complex project and/or one or more of tasks used to complete the complex project. In some embodiments, the quality factor may be addressed by including one or more tasks that ensure or verify a given quality level, such as, for example, the action verification units discussed herein.

Additionally, a quantity of tasks factor may identify a priority corresponding to a solution that includes fewer discrete tasks versus more discrete tasks. Some embodiments provide that a cost priority factor may identify a priority corresponding to a solution that has a lower cost relative to other solutions. In some embodiments, a completion time factor may identify a priority corresponding to a solution that is provided more quickly than other solutions. In some embodiments, the completion time factor may be expressed as a completion threshold that identifies a maximum completion time for any given solution.

A solution path may be generated in the task graph (block 510). Some embodiments provide that the solution graph includes the tasks that are selected to connect the source node of the complex project to the target node of the complex project in the task graph. In some embodiments, the solution path includes multiple tasks and intervening nodes that are between the source node and the target node. Some embodiments provide that the solution path includes a task from a human network resource and a task from a device network resource.

In some embodiments, multiple solution paths may be generated. Each of the multiple solution paths may include different combinations of tasks for performing the complex project. In this manner, a client (device and/or human) may select a solution path that best satisfies the complex project requirements and/or priorities. In some embodiments, the selection of the solution path may be automated based on one or more priorities and/or project goal factors. For example, some embodiments provide that the selection may be algorithmically performed based on project goal factors. In some embodiments, the solution path in the task graph includes tasks that are performed in parallel with one another and/or tasks that are performed sequentially.

Some embodiments provide that the solution path may be generated, in part, by accessing a collaboration pattern library (block 514). For example, a collaboration pattern library may include a collection of identified collaboration patterns that use multiple different known tasks to accomplish complex projects and/or portions thereof.

Some embodiments include publishing the task graph at substantially regular intervals (block 516). In some embodiments, the task graph may be published responsive to events such as the detecting of non-trivial changes in the task graph, and/or based on the quantity of received client inputs and/or skill identification data from network resources. For example, additional and/or updated skill identification data corresponding to a skill of a network resource may be received after the tasks are represented as edges in the task graph (block 512). In such cases, an updated task may be generated for each newly reported skill (block 504) and the task graph may be updated (block 506) to include the updated tasks. In some embodiments, each network resource may be configured to provide regular updates regarding available skills and/or to confirm a continued availability to perform such skills. Some embodiments provide that such updates may be responsive to polling such that a request for skill identification data is sent to the network resources. In some embodiments, only tasks that are updated as available may be used in generating the solution path in the task graph.

An executable description of the workflow of tasks that are in the solution path may be generated (block 518). In some embodiments, the executable description may be generated in a suitable language for execution, such as, for example, CrowdWON, among others. Some embodiments provide that the executable description may be generated as a set of sequences of tasks that correspond to function compositions and/or concurrency nodes corresponding to parallel compositions of functions. Some embodiments provide that patterns and/or subpatterns that are already expressed in the executable description may be reused.

A publication/subscription catalog may contain the tasks that can be performed using the thing-sourcing collaboration module. As described above, the tasks may be represented as edges in a task graph. For example, two tasks, Task A and Task B, may share a node (target node of Task A and source node of Task B) if the output of Task A may be used as an input for Task B. As such, performing Task A as a function $f_A$ that transforms inputs in its domain, (e.g., X), into its codomain, (e.g., Y), which may be represented as $f_A: X \rightarrow Y$. Task A may be connected to Task B if the domain $f_B$ is Y.

Consider an example in which the task of translating a French text into Swedish can be represented by a function $f_{translate\ French\ to\ Swedish}$ (French texts→Swedish texts). Some embodiments provide that the edge in the task graph may be annotated with additional information about the task. For example, in some embodiments, the additional information may be information per edge and/or per network resource entity. Additional information that is per edge may be information that is related to the task itself such as, for example, a mathematical expression describing the function. For example, using the above task of translating a French text into Swedish, the corresponding edge may include an associated expression that ensures that the meanings of the input and output texts are the same.

Note that a mathematical expression may only be needed if more than one type of function going from the same domain to the same codomain exists. In the present example, if the catalog includes only functions going from French texts to Swedish texts that preserve the meaning, it may not be necessary to include this restriction. Some embodiments provide that if the catalog contains a task that receives a French text and produces a Swedish version in which the meaning is the opposite of the original text, then it may be necessary to distinguish between the two tasks by using such mathematical expressions.

In the case of per entity information, the additional data may be repeated for each entity available to perform the task. In some embodiments, the additional information may include factors such as quality, time, available capacity, and/or cost, among others. An example of quality may include a formula indicating how good the entity is at performing the corresponding task. For example, for tasks generating an output without an input, the formula may be a constant indicating the quality of the output. For transforming tasks, the factor may be a formula the depends on the quality of the input. For tasks that are specifically directed at improving quality, formula may include quality threshold and/or quality range that may be determined based on the input quality. In the context of the time factor, a formula may define an expected minimum/average/maximum time to perform the task given the size of the input. Some embodiments provide that available capacities may be provided as a list of values representing limits on resources that the network resource can provide such as, for example, storage capacity.

Consider another example in which two network resources H and M are capable of performing the task of translating a French text into Swedish. Network resource H may represent a human that has a quality of 0.95 t, which may be interpreted as the probability of giving a good translation if input text has a given quality t. Network resource H may take about three seconds per word to translate and may be willing to translate up to five hundred words at $0.05 per word. In contrast, network resource M may include a machine translation device that has a quality of 0.75, takes 0.001 seconds per word and can translate up to two million words with the cost of $0.003 per word. The complex project submitted to the thing sourcing platform may be expressed as a source node and a target node in the task graph along with a mathematical expression relating inputs and outputs. Additionally, information corresponding to constraints in terms of time, cost, quality and/or capacity, among others, may be provided.

In one example, a requester may want to translate from a French text (x) to a Swedish text(y) such that the meaning is preserved, the original text has four hundred words, the time should be less than one hour, and the maximum allowed cost would be ten dollars with the quality of no less than 0.8. The solution may be generated in the task graph from the source node to the target node so that only edges representing tasks with available workers are selected in the criteria are satisfied. Some embodiments provide that two consecutive edges in the task graph may be equivalent to the composition of the two functions on the respective edges and may lead to sequential planning. For example, $X \rightarrow Y \rightarrow Z$ may correspond to $(g \cdot f) = g(f(x))$ that may translate to the sequence of apply first f, then g.

In addition to series or sequential execution, complex projects may realize benefits from parallel execution of certain tasks. Some embodiments provide that the parallel execution of functions may be expressed as $(f\|g)(x,x')=(f(x), g(x'))$. Such decomposition may be advantageous when a task needs to produce a result that is a combination of independent results.

Some embodiments provide that the task graph may be very large. As such, embodiments may use explicit graph representations that store all of the nodes and edges and/or symbolic representations in which edges and nodes or sets thereof may be described using formulas. In the context of symbolic representations, paths communicating between two nodes may be computed using reachability analysis techniques on symbolic graphs. In embodiments in which a task graph is large, the source and target nodes may be far away from one another. In such embodiments, a large number of solutions may be provided. Selection among the large number of solutions may be based on the additional constraints provided in the client input.

In addition to generating sequences of tasks, some embodiments herein include a library of collaboration patterns and/or sub-patterns that may be capable of guaranteeing some of the additional constraints. For example, action verification sub-patterns may be used in cases in which quality is a requisite constraint.

Some embodiments provide that based on a solution path generated in the task graph, a description of the workflow of tasks that may be executed in a suitable language may be generated. Some embodiments provide that the executable description may be generated as a set of sequences of tasks that correspond to function compositions and/or concurrency nodes corresponding to parallel compositions of functions. Some embodiments provide that patterns and/or sub-patterns that are already expressed in the executable description may be reused.

Since methods herein may include mathematical expressions and may need to be determined equivalence of such evaluated expressions, some complex projects may not be properly and/or fully solved. In such embodiments, a partial solution may be provided as an output so that a human resource and/or multiple crowdsourced human resources may complete and/or solve unaddressed portions thereof.

Figure 8:
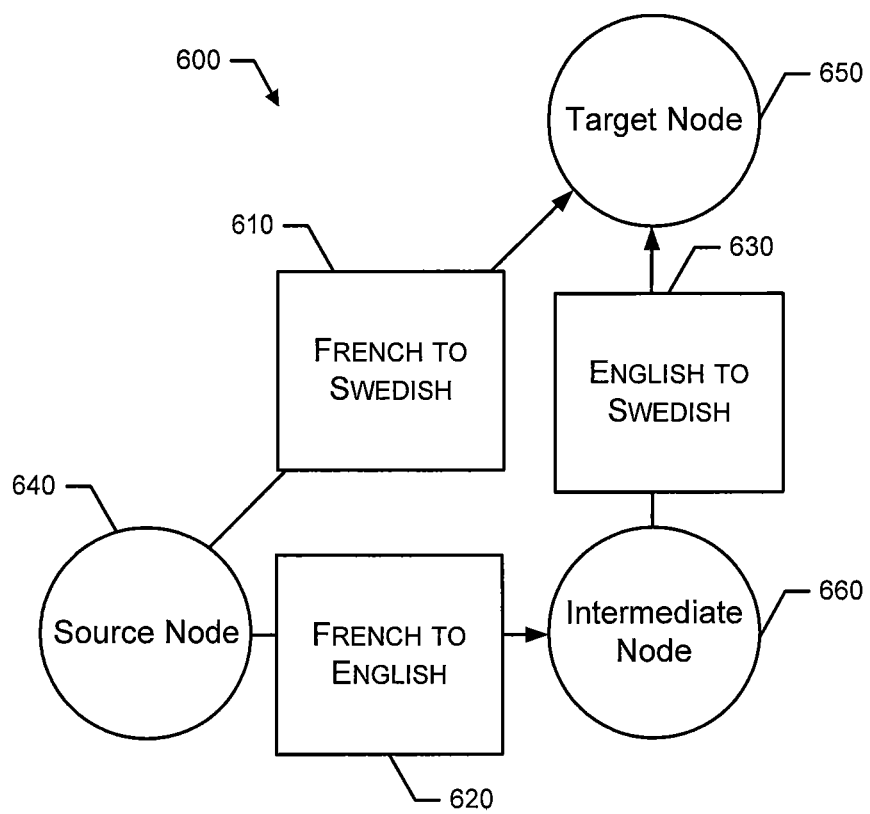
FIG. 8 is a task graph 600 that illustrates tasks and nodes in an example according to some embodiments of the present invention.

Still considering an example in which a device needs a translation of a French text into Swedish, reference is now made to FIG. 8, which is a task graph 600 that illustrates tasks and nodes in an example according to some embodiments of the present invention. The task graph 600 includes a source node 640 that corresponds to the starting point in the task graph for the requested project of translating the French text into Swedish and that may have an input and/or an output that includes a French text that a client wants translated into Swedish. The task graph 600 also includes a target node 650 that corresponds to the ending point in the task graph for the requested project of translating the French text into Swedish and that may have an output that includes the text translated into Swedish for the client.

As illustrated, multiple solution paths may be determined. For example, a French to Swedish translating task 610 may provide a first solution path that is a direct solution path between the source node 640 and the target node 650. However, some embodiments provide that a network resource for the French to Swedish translating task 610 may not be listed in a published catalog as available. In such cases, a second solution path that includes a French to English translating task 620 from the source node 640 to an intermediate node 660 and an English to Swedish translating task 630 from the intermediate node 660 to the target node 650 may be used to accomplish the project of translating the French text into Swedish.

Some embodiments provide that each of the two solution paths may be available and that one may be selected over the other based on additional constraints in the client input requesting the complex project. As described above, additional constraints may include quality, confidence, cost and/or timeliness, among others.

The task graph 600 is a simple task graph having few nodes and/or tasks identified therein. However, according to embodiments herein, a task graph may be much larger including many nodes and/or tasks and thus may provide many alternative solution paths between a source node and a target node. In such embodiments, a client request may further specify that the number of tasks in the selected solution path be minimized, which can guide the thing-sourcing platform to select a collaboration workflow that satisfies the various constraints. Additionally, to the extent that confidence is priority constraint, the thing-sourcing platform may select more than one of the solution paths and then have the multiple results evaluated by other sources, including, for example, a group having a skill set that is relevant to the complex project. For example, in the case of the translating project, the group may be a group of Swedish speakers.

Figure 9:
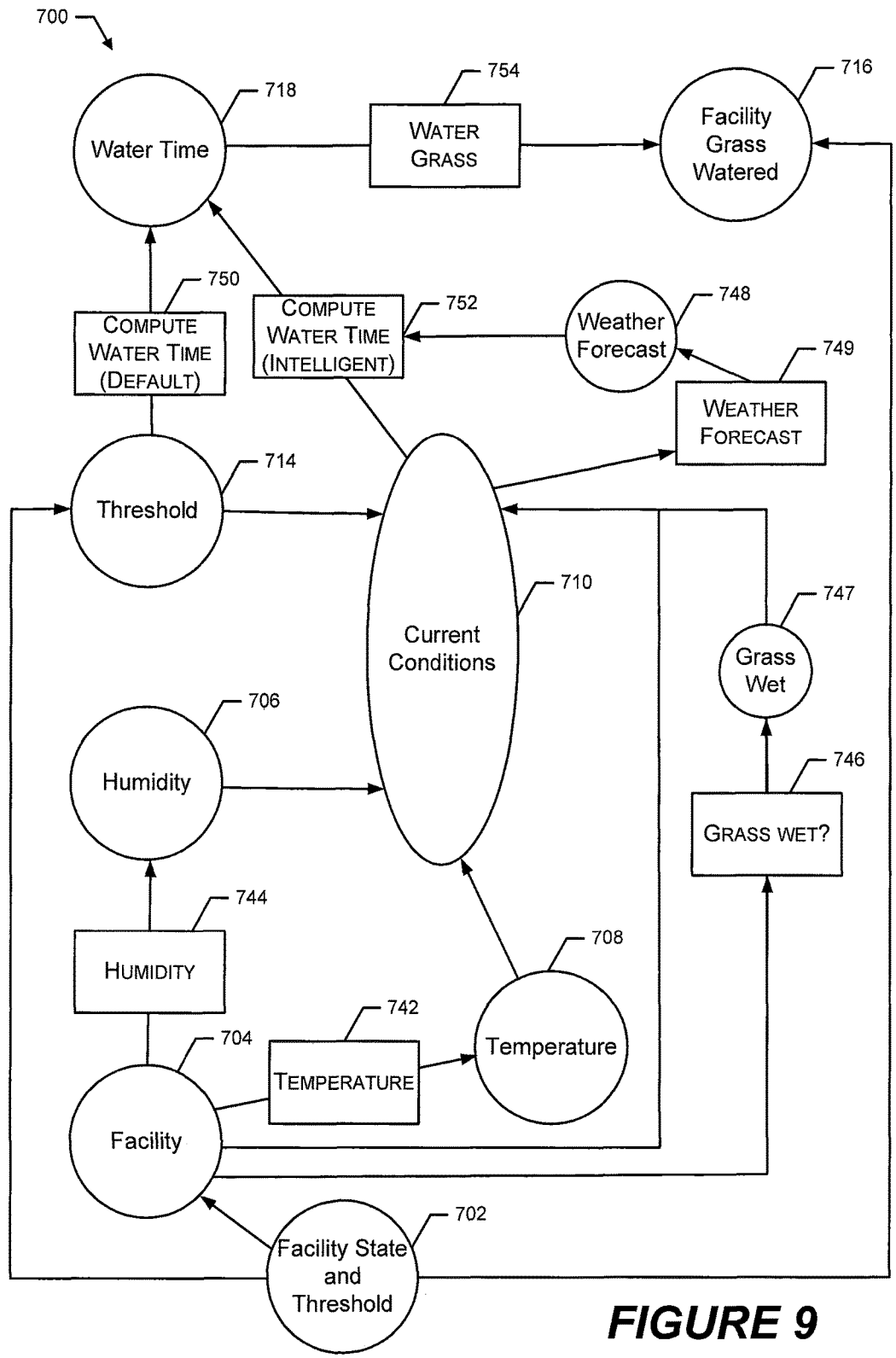
FIG. 9 is a task graph 700 that illustrates tasks and nodes in an example according to some embodiments of the present invention.

Considering another example in which a client requests a solution to the complex project of having an optimal level of minimum humidity in the grass of a facility, according to the season, with minimum cost and a quality of 90 percent (i.e., a confidence of 90% that the grass will have at least that humidity. In this example, the task may be published daily by the client so that each complex project corresponds to a single day. Reference is now made to FIG. 9, which is a task graph 700 that illustrates tasks and nodes in an example according to some embodiments of the present invention. The task graph 700 may include a source node that is the state of the facility and threshold node 702 and a target node that is the facility grass watered node 716. The facility grass watered node 716 in this example is the facility at a state in which the grass has a humidity over the given threshold.

Some embodiments provide that a catalog includes a water the grass task 754 provided by, for example, a sprinkler system, that can water the grass at the facility for t minutes at a cost of $0.5*t and a quality of 99%. Other tasks may be provided to obtain the state of the grass (e.g., wet or not) 746, and the temperature 742 and humidity 744 of the area. Two devices may be provided to compute the time that the water grass task 754 is performed. The first device performs a compute water time (default) task 750 that is operable to use the humidity threshold 714 that is provided by the facility state and threshold node 702 to compute the watering time. Some embodiments provide that this may vary based on season. Using the compute time default task 750, the water grass task 754 is performed for about 30 minutes.

The second device performs a compute water time (intelligent) task 752 that may take into account current conditions 710 and/or a weather forecast 748. Current conditions 710 may include whether the grass is already wet (i.e., grass wet 747) using a grass wet task 746. Using the compute water time (intelligent) task 752, the water grass task 754 is performed for about 20 minutes. Additionally, the task graph may include sub-tasks for providing inputs to the weather forecast task 748. For example, a humidity task 744 and a temperature task 742 may provide humidity 706 and temperature 708 to a current conditions node 710, the output of which may be an input for the weather forecast task 748.

The state of the facility and threshold node 702 may provide data to a facility node 704, the facility grass watered node 716, and the threshold node 714. A current conditions node 710 may provide an input to the compute time intelligent task 752 based on received data including the threshold 714 and outputs from the weather forecast task 748 and the grass wet task 746.

For the current example, consider that there are two entities that provide the grass wet task 746. The first is an automatic sensor with 80% accuracy (quality), a $0.01 cost, a 0.01 second time. The second is a human resource with 99% accuracy, a $1 cost, and a 30 second time. Additionally, there are two different sensors for performing the humidity task 744 and the temperature task 742. The sensor for performing the humidity task 744 has a 98% quality and a $0.05 cost and the sensor for performing the temperature task 742 has a 95% quality and a $0.02 cost. Further, the device for performing the weather forecast task 748 has a very short term accuracy of about 95% and a $5 cost. The table below summarizes the available tasks:

| Task | Device | Quality | Cost | Time |
|---|---|---|---|---|
| Water grass (Water time) → Facility grass watered | Sprinkler system | 0.99 * time input quality | $0.5 * time | time |
| Humidity? | Sensor | 0.98 | $0.05 | 0.01 s |

-continued

| Task | Device | Quality | Cost | Time |
|---|---|---|---|---|
| Facility → humidity Temperature? | Sensor | 0.95 | $0.02 | 0.01 s |
| Facility → temperature Grass wet? | Sensor | 0.80 | $0.01 | 0.01 s |
| Facility → grass wet Grass wet? | Human | 0.99 | $1 | 30 s |
| Facility → grass wet Weather forecast (temperature, humidity) → forecast | API | 0.95 * lowest input | $5 | 1 s |
| Compute water time Threshold → time If water grass(time) then Grass humidity > threshold | Default scheduler | 1.0 | $0.1 | 0 |
| Compute water time (threshold, grass wet, forecast) → Water time) If water grass(time) then Grass humidity > threshold | Intelligent scheduler | 0.99 * lowest input | $0.6 | 0 |

As illustrated in FIG. 9, examples of parallel compositions include tasks corresponding to temperature and humidity to generate an appropriate input to the weather forecasting task. The current example may provide two basic solution paths to reach the objective. The first solution path includes using the default scheduler and the second solution path includes using the intelligent scheduler. Additionally, the latter solution path includes two devices for determining the wetness of the grass. Considering that every task is used just once, all paths may be evaluated as follows:

Default: 1.0*0.99=99%, $0.1+$0.5*30=$15.1

Intelligent (Sensor): min(min(98%,95%)*95%, 80%)*99%*99%=78%, $0.05+$0.02+$0.01+$0.6+$0.5*20=$10.68

Intelligent (Human): min(min(98%,95%)*95%, 99%)*99%*99%=88%, $0.05+$0.02+$1+$0.6+$0.5*20=$11.67

As provided above, the only solution path initially satisfying all requirements is the solution path that includes the default scheduler. However, in the library of available sub-patterns there may be a sub-pattern that may increase the quality of a particular step by replicating the task published for that skill and then doing a majority vote. Since the thing-sourcing platform may use the formula used to compute the quality, the thing-sourcing platform may detect which qualities should be improved to attain the desired output:

Intelligent (Sensor, improved): min(min(98%,majority-of-3(95%))*95%, majority-of-5 (80%))*99%*99%=91%, $0.05+3*$0.02+5*$0.01+$0.6+$0.5*20=$10.76

Intelligent (Human, improved): min(min(98%,majority-of-3(95%))*95%, 99%)*99%*99%=91%, $0.05+3*$0.02+$1+$0.6+$0.5*20=$11.71

Thus the algorithm will propose the workflow corresponding to the "Intelligent scheduler (Sensor, improved)" path.

This simplified example illustrates the potential of the thing-sourcing platform for the internet of things. For example, in the case in which only the sprinkling system with the default scheduler is installed, the system will still be able to meet the requirements, although it will not be very smart. As new devices get connected, their capabilities will appear as new tasks (i.e., edges in the graph), providing alternative ways of obtaining a similar result. In this example, the addition of sensors automatically increases the intelligence of the system that could even change the workflow used to execute a task without user intervention to obtain better results.

Additionally, embodiments disclosed herein may include the ability to replace unavailable data by historical or modeled data. In such embodiments, the replacement task may have the same edge as the original task it is replacing, but in which the quality will be logically inferior to the original quality. As in the current example, the humidity detector could have been replaced by a time series model that we know has an accuracy of 80% (although this would have created a quality constraint violation in our particular example). In this way data brokers can be integrated as well.

Embodiments herein may be provided as a centralized planning problem as opposed to a distributed one, in which several agents have to coordinate themselves to generate a plan. As such, a thing-sourcing platform herein may receive all the information of the devices as they connect to the system.

However, although in theory it can represent several costs per action, with formulas specifying each cost (which is our case, as we have time and quality metrics), the reality is that most planners consider just fixed costs and a single one if at all. Consider as well that "time cost" is of a special type, because the formula depends on how actions are layout (either sequential or parallel), which is an information not available in a typical planning tool, such as, for example, a standard planning definition language such as planning domain definition language (PDDL), as it depends on the execution plan.

Embodiments herein may include a library of collaboration sub-patterns. Some embodiments provide that these sub-patterns may be integrated as additional actions available to the planner, since they may be more templates than concrete actions (like the mechanism of generic lists in programming languages avoids redefining lists for each type of possible data). However, integrate these sub-patterns may generate excessive actions. Some embodiments provide that the sub-patterns may be used on-demand to fix possible solution path violations.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines. These tools may further be used to implement systems/methods according to some embodiments described herein.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer implemented method, comprising:
receiving from each of a plurality of network resources, skill identification data that corresponds to a skill that is possessed by a corresponding network resource of the plurality of network resources;
generating, for each skill, a task that corresponds to the skill, wherein ones of the plurality of network resources are capable of performing corresponding ones of a plurality of tasks that are based on corresponding ones of a plurality of skills;
representing each of the plurality of tasks as an edge in a task graph, the edge connecting an input node that represents an input for the task and an output node that represents an output corresponding to the task;
receiving a client input that corresponds to a complex project that is performed using selected ones of the plurality of tasks, wherein the complex project defines a source node that includes input information corresponding to the complex project and a target node that defines output information corresponding to the complex project; and
generating a solution path in the task graph that includes the selected ones of the plurality of tasks and that connects the source node in the task graph to the target node in the task graph,
wherein generating the solution path in the task graph comprises accessing a collaboration pattern library and identifying a collaboration pattern that is operable to perform one of the plurality of tasks, and
wherein at least one of receiving skill identification data, generating the task, representing the tasks, receiving the client input, and generating the solution path is performed by at least one processor.

2. The method according to claim 1, wherein the plurality of network resources includes a human resource and a network connected device.

3. The method according to claim 2, wherein the network connected device comprises an internet of things device and/or an application programming interface that is executing on a computing device.

4. The method according to claim 1, wherein the solution path includes a task from a human network resource and a task from a device network resource.

5. The method according to claim 1, further comprising:
receiving updated skill identification data that corresponds to the skill that is possessed by a corresponding network resource of the plurality of network resources;
generating, for each skill, an updated task that corresponds to the skill, wherein ones of the plurality of network resources are capable of performing corresponding ones of a plurality of tasks that are based on corresponding updated ones of the plurality of skills; and
updating the task graph to include the updated ones of the plurality of tasks.

6. The method according to claim 5, wherein only tasks that are updated as available are used in generating the solution path in the task graph.

7. The method according to claim 1, wherein representing each of the plurality of tasks in the task graph comprises representing edges corresponding to network resources that are available and not representing edges corresponding to network resources that are not available.

8. The method according to claim 1, wherein representing each of the plurality of tasks in the task graph comprises representing edges corresponding to network resources that are available and replacing edges corresponding to network resources that are not available with substitute edges.

9. The method according to claim 8, wherein the substitute edges correspond to a default task and/or a replacement task that is generated from historical task data.

10. The method according to claim 1, wherein generating the solution path in the task graph comprises generating a plurality of solution paths that include different combinations of tasks for performing the complex project.

11. The method according to claim 1, wherein the solution path includes tasks that are performed in parallel with one another and/or tasks that are performed sequentially.

12. The method according to claim 1, further comprising publishing the task graph at substantially regular intervals, wherein each publication includes updated ones of the plurality of tasks that are available to be used in the solution path.

13. The method according to claim 1, wherein the client input includes a plurality of project goal factors that identify goals corresponding to generating the solution path that identifies tasks connecting the source node in the task graph to the target node in the task graph via an intervening node that is between at least two of the selected tasks.

14. The method according to claim 13 wherein the plurality of project goal factors correspond to a quality factor, a quantity of tasks factor, cost priority factor and/or a completion time factor.

15. A computer implemented method, comprising:
receiving, from each of a plurality of network resources, skill identification data that corresponds to a skill that is possessed by a corresponding network resource of the plurality of network resources;
generating, for each skill, a task that corresponds to the skill, wherein ones of the plurality of network resources are capable of performing corresponding ones of a plurality of tasks that are based on corresponding ones of a plurality of skills;
representing each of the plurality of tasks as an edge in a task graph, the edge connecting an input node that represents an input for the task and an output node that represents an output corresponding to the task;
receiving a client input that corresponds to a complex project that is performed using selected ones of the plurality of tasks, wherein the complex project defines a source node that includes input information corresponding to the complex project and a target node that defines output information corresponding to the complex project; and
generating a solution path in the task graph that includes the selected ones of the plurality of tasks and that connects the source node in the task graph to the target node in the task graph, wherein generating the solution path in the task graph comprises generating a plurality of solution paths that include different combinations of tasks for performing the complex project, and wherein at least one of receiving skill identification data, generating the task, representing the tasks, receiving the client input, and generating the solution path is performed by at least one processor.

16. A computer program product comprising:
a non-transitory computer readable storage medium having computer readable program code embodied in the medium, the computer code comprising:
computer readable code to represent each of a plurality of tasks as an edge in a task graph, the edge connecting an input node that represents an input for the task and an output node that represents an output corresponding to the task;
computer readable code to receive a client input that corresponds to a complex project that is performed using selected ones of the plurality of tasks, wherein the complex project defines a source node that includes input information corresponding to the complex project and a target node that defines output information corresponding to the complex project; and
computer readable code to generate a solution path in the task graph that includes the selected ones of the plurality of tasks and that connects the source node in the task graph to the target node in the task graph,
wherein the client input includes a plurality of project goal factors that identify goals corresponding to generating the solution path that identifies tasks connecting the source node in the task graph to the target node in the task graph via an intervening node that is between at least two of the selected tasks, and
wherein the plurality of project goal factors correspond to a quality factor, a quantity of tasks factor, cost priority factor and/or a completion time factor.

17. The computer program product according to claim 16, further comprising:
computer readable code to receive updated skill identification data that corresponds to a skill that is possessed by a corresponding network resource of a plurality of network resources;
computer readable code to generate, for each skill, an updated task that corresponds to the skill, wherein ones of the plurality of network resources are capable of performing corresponding ones of a plurality of tasks that are based on corresponding updated ones of a plurality of skills; and
computer readable code to update the task graph to include the updated ones of the plurality of tasks, wherein only tasks that are updated as available are used to generate the solution path in the task graph.

* * * * *